(12) United States Patent
Hernoust et al.

(10) Patent No.: US 11,455,285 B2
(45) Date of Patent: Sep. 27, 2022

(54) METHOD FOR MANAGING A DATABASE SHARED BY A GROUP OF APPLICATIONS, RELATED COMPUTER PROGRAM AND ON-BOARD SYSTEM

(71) Applicant: THALES, Courbevoie (FR)

(72) Inventors: Thibault Hernoust, Merignac (FR); Philippe Bousquet, Merignac (FR); Cedric Bernicot, Merignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/065,318

(22) Filed: Oct. 7, 2020

(65) Prior Publication Data
US 2021/0109909 A1 Apr. 15, 2021

(30) Foreign Application Priority Data
Oct. 11, 2019 (FR) ...................... 19 11320

(51) Int. Cl.
*G06F 16/00* (2019.01)
*G06F 16/215* (2019.01)
*G06F 16/27* (2019.01)
*G06F 16/242* (2019.01)
(Continued)

(52) U.S. Cl.
CPC .............. *G06F 16/215* (2019.01); *G06F 8/71* (2013.01); *G06F 16/244* (2019.01); *G06F 16/252* (2019.01); *G06F 16/27* (2019.01)

(58) Field of Classification Search
CPC ...... G06F 16/215; G06F 16/27; G06F 15/244; G06F 16/252
See application file for complete search history.

(56) References Cited

U.S. PATENT DOCUMENTS

| | | | |
|---|---|---|---|
| 2006/0200497 A1* | 9/2006 | Hu ....................... | G06F 11/1471 |
| 2007/0180075 A1* | 8/2007 | Chasman ................ | G06F 16/27 |
| | | | 709/223 |
| 2012/0016849 A1 | 1/2012 | Garrod et al. | |

(Continued)

OTHER PUBLICATIONS

Anonymous, Replication (computing)—Wikipedia, the free encyclopedia, XP055298586, Extrait de l'Internet: URL:https://en.wikipedia.org/w/index.php?title+Replication (computing)&oldid+667046570, p. 3, (Jun. 15, 2015).

(Continued)

*Primary Examiner* — Khanh B Pham
(74) *Attorney, Agent, or Firm* — ArentFox Schiff LLP (57) ABSTRACT

The invention relates to a method for managing a database shared by a group of applications. The database comprises elements, each comprising a value and a version number. Each application comprises a replica of the database.

The method comprises a step for modifying the value of an element in the replica of an application, called active application, a step for incrementing the version number of said element in said replica of the active application, a step for transmitting, via the active application, transmission data to the other applications, the transmission data comprising the modified element, and an earlier version number of this modified element, a synchronization step, during which at least one application other than the active application updates its replica based on a comparison of the earlier version number with that of said element in this replica.

12 Claims, 4 Drawing Sheets

(51) Int. Cl.
    *G06F 16/25*     (2019.01)
    *G06F 8/71*      (2018.01)

(56)             References Cited

U.S. PATENT DOCUMENTS

2015/0370844 A1* 12/2015 Chen .................. G06F 16/2365
                                                         707/634
2018/0018381 A1*  1/2018 Tong ....................... G06F 16/27

OTHER PUBLICATIONS

French Search Report issued by the French Patent Office in corresponding Application No. FR 1911320, dated Jun. 9, 2020.
Saito, Y. et al., "Optimistic Replication", Microsoft Technical Report—MSR-TR-2003-60, vol. Microsoft Technical Report, pp. 1-47, (Sep. 1, 2003).

* cited by examiner

METHOD FOR MANAGING A DATABASE SHARED BY A GROUP OF APPLICATIONS, RELATED COMPUTER PROGRAM AND ON-BOARD SYSTEM

CROSS-REFERENCE TO RELATED APPLICATIONS

This application is a U.S. non-provisional application claiming the benefit of French Application No. 19 11320, filed on Oct. 11, 2019, which is incorporated herein by reference in its entirety.

FIELD

The present invention relates to a method for managing a database shared by a group of applications.

The present invention also relates to a non-transitory computer-readable medium including a computer program, and to an on-board database management system.

More specifically, the present invention falls within the framework of the management of a database in an avionics system.

BACKGROUND

Methods for managing such databases are subject to many constraints, for example real-time constraints. These constraints for example have response times ranging from several seconds to several milliseconds in the considered functional chains.

Additionally, in applications with avionics systems, the computing and memory resources necessary to manage a database are limited. Thus, the management methods have high performance constraints, while respecting these limited computing and memory resources.

In avionics systems, a plurality of sensors are configured to provide data to separate applications. These applications are configured to process data in order to update a database.

At the same time, in order for the avionics system to run correctly, the database is forced to present data that is always coherent and secure.

To that end, systems are known comprising a server including a centralized database as well as a plurality of clients. Each client is configured to send read or write requests to the centralized database. The read or write requests from these multiple clients are managed by predetermined transaction mechanisms.

However, such a system involves locking of the database while a transaction (reading or writing) is in progress. For example, such a system may implement a management method having the following steps:
  a low-priority client conducts a transaction in order to modify data and therefore locks the centralized database;
  this transaction is interrupted by a high-priority client performing a transaction to modify the same data, the data being locked, the high-priority client waits;
  the low-priority client takes back control and completes its transaction, it therefore unlocks the database;
  the high-priority client takes back control and completes its transaction.

One can thus see that the high-priority client completes its transaction after the low-priority client. Thus, the transaction of the high-priority client is slowed down.

The locking thus leads to noncompliance with the real time constraint described above. Indeed, a transaction cannot be done when the database is locked by another transaction.

Management methods are also known having a fixed work frequency so as to obtain desired processing times. However, such methods cannot satisfy the constraints relative to limited computing and memory resources.

As a result, the known management methods are not fully satisfactory. In particular, the known management methods do not respect all of the constraints described above, in particular regarding the real time processing and the limited use of the computing and memory resources.

SUMMARY

One aim of the invention is thus to propose a method for managing a database allowing real-time processing, while requiring relatively low computing and memory resources.

To that end, the invention relates to a method for managing a database shared by a group of applications, the applications being implemented by one or several on-board systems. The database comprises elements, each element comprising a value and a version number. Each application comprises a replica of the database, the replicas being identical during the initialization of the method. The management method comprises:
  a step for modifying the value of at least one element in the replica of the database of an application, called active application, of the group of applications;
  a step for incrementing the version number of said element in the replica of the database of the active application;
  a transmission step during which the active application transmits transmission data to the other applications of the group of applications, the transmission data comprising the element modified during the modification and incrementation steps, and an earlier version number of this modified element, the earlier version number being the version number of this element before the implementation of the modification and incrementation steps;
  a synchronization step, during which at least one application of the group of applications other than the active application updates its replica of the database based on a comparison of the earlier version number with the version number of said element in this replica.

One can see that, according to the invention, each application processes the elements in its replica of the database independently relative to the other applications. Therefore, the applications are able to update the database at several separate frequencies. Thus, the management method makes it possible to guarantee processing in real time.

The management method according to the invention also makes it possible to guarantee, even when there is a difference in elements in the replicas relative to one another, that all of the replicas of the database are coherent relative to one another, while needing low computing and memory resources. In particular, the management method makes it possible to detect inconsistencies between the replicas through the version number of the elements.

According to other advantageous aspects of the invention, the management method comprises one or more of the following features, considered alone or according to all technically possible combinations:
  during the synchronization step, an application other than the active application declares the modified element to be valid if the earlier version number is equal to the version number of this element in its replica of the database, the application declaring the modified element to be invalid otherwise;

said application replaces the corresponding element in its replica of the database with the modified element if this modified element is declared to be valid;

when the element is declared to be invalid, said application marks the value of said element as invalid in its replica of the database;

when the element is declared to be invalid, the application changes the version number of said element by the highest version number among the version number in its replica of the database and the version number comprised in the modified element comprised in the transmission data;

the management method comprises a correction step during which an application from the group of applications, called correction application, calculates the value of the element declared to be invalid in order to obtain at least one corrected element;

the management method further comprises a step for additional transmission of the corrected element by the correction application to the other applications of the group of applications;

each replica of the database is exclusively modifiable by the application comprising this replica;

the modification step is implemented, for a predetermined element, by a single predetermined application of the group of applications;

the value of at least one element comprised in each replica of the database is a function of a plurality of value arguments;

during the modification step, the active application modifies a value argument of the plurality of value arguments, this value argument being associated with the active application.

The invention also relates to a non-transitory computer-readable medium including a computer program comprising software instructions which, when executed by a computer, implement a method as described above.

The invention also relates to an on-board database management system shared by a group of applications, the applications being configured to be implemented by the on-board system. The database comprises elements, each element comprising a value and a version number. Each application comprises a replica of the database, the replicas being identical during the initialization of the on-board system. One application, called active application, of the group of applications is configured to modify the value of at least one element in its replica of the database. The active application is configured to increment the version number of said element in the replica of the database. The active application is configured to transmit transmission data to the other applications of the group of applications, the transmission data comprising the modified and incremented element, and an earlier version number of this element, the earlier version number being the version number of this element before its modification and incrementation. At least one application of the group of applications other than the active application is configured to update its replica of the database based on a comparison of the earlier version number with the version number of said element in this replica.

The invention also relates to a method for updating a database shared by a group of applications, the applications being updated by one or several on-board systems, the database comprising a plurality of elements, each element comprising a value, each application comprising a replica of the database, the method comprising:

a step for reception by an application of the group of applications, called processing application, of at least one element from the plurality of elements;

a step for comparison by the processing application of the value of said element with the value of this element in its database replica, and when the value of said element is different from the value of this element in its replica of the database, the method comprising:

a step for detection by the processing application of an inconsistency in the value of said element relative to an expected value of said element, the inconsistency being determined according to the operation of the on-board system(s), a step for marking the value of said element as being invalid, said element being called invalid element;

a step for correcting the invalid element, during which an application from the group of applications, called correction application, calculates the value of the invalid element in order to obtain at least one corrected element, and a step for transmission of the corrected element by the correction application to the other applications of the group of applications.

According to other advantageous aspects of the invention, the update method comprises one or more of the following features, considered alone or according to all technically possible combinations:

the method further comprises a transmission step during which the processing application sends the invalid element at least to the correction application;

the processing application is the correction application;

the value marked as being invalid of at least one element during the marking step is a function of a plurality of value arguments;

each value argument is associated with a corresponding application of the group of applications, the value argument associated with this application being modifiable exclusively by this application;

during the correction step, the correction application applies a transfer function to the value of the invalid element in order to obtain a corrected value of the corrected element;

the transfer function depends on several transfer arguments;

each transfer argument corresponds to one of the value arguments of the plurality of value arguments;

the value marked as being invalid during the marking step of at least one element is a function of a unique argument;

during the correction step, the applications restart by initializing the unique argument at an initial argument specific to each element;

each initial argument is the argument of the respective element in a state of the replica of the database in which the set of elements is valid;

the update method comprises a step for selection of the correction application in the group of applications based on a workload of each application.

The invention also relates to a non-transitory computer-readable medium including a computer program comprising software instructions which, when executed by a computer, implement a method as described above.

The invention also relates to an on-board system for updating a database shared by a group of applications, the applications being configured to be implemented by one or several on-board systems, the database comprising a plurality of elements, each element comprising a value, each application comprising a replica of the database, wherein an application of the group of applications, called processing application is configured to receive at least one element from the plurality of elements, wherein the processing application is configured to compare the value of said element with the value of this element in its database replica, and wherein, when the value of said element is different from the value of this element in its replica of the database:

the processing application is configured to detect an inconsistency in the value of said element relative to an expected value of said element, the inconsistency being determined according to the operation of the on-board system(s), the processing application is configured to mark the value of said element as being invalid, said element being called invalid element;

an application from the group of applications, called correction application, is configured to calculate the value of the invalid element in order to obtain at least one corrected element, and the correction application is configured to transmit the corrected element to the other applications of the group of applications.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION

Figure 1:
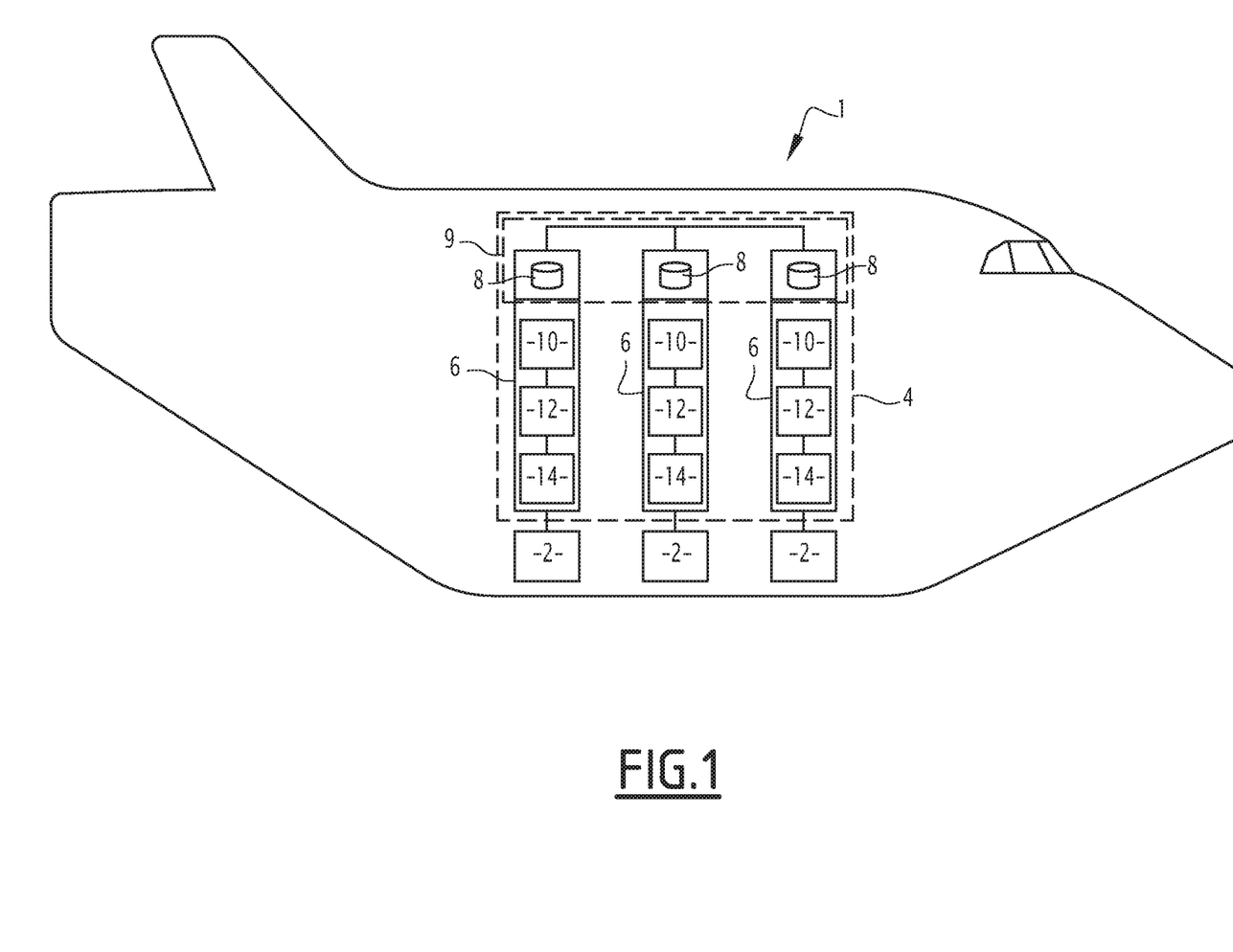
FIG. 1 is a schematic view of an aircraft comprising an on-board system according to the invention.

FIG. 1 shows an aircraft 1 comprising a plurality of sensors 2 and an on-board system 4.

According to a variant that is not shown, the aircraft 1 comprises several on-board systems 4.

Also according to variants that are not shown, the sensors 2 and the on-board system 4 are implemented in a ship, a road vehicle or a rail vehicle.

The sensors 2 are sensors configured to measure data relative to the situation of the aircraft, its environment or relative to other aircraft. For example, the sensors 2 comprise at least one sensor chosen from the following list: a location sensor, a pressure sensor and/or a temperature sensor, an image sensor, an audio sensor, a satellite data sensor, a surrounding aircraft sensor, such as a sensor of a Traffic alert and Collision Avoidance System (TCAS) and a weather sensor, such as a sensor comprising a weather radar.

The on-board system 4 is configured to implement a plurality of applications 6.

Each application 6 comprises a replica 8 from a database 9. The database 9 is thus formed by the replicas 8. The database 9 is then shared by the applications 6.

As shown in the example of FIG. 1, the database 9 has no centralized database. In particular, all of the replicas 8 have an equal hierarchical level relative to one another. "Equal hierarchical level" means that the information of any one replica 8 does not prevail over the information of the other replicas 8.

Each application 6 further comprises an acquisition module 10, a processing module 12 and an output module 14.

Each application 6 assumes the form of an independent computer or is for example integrated into a flight management system (FMS) of the aircraft 1, an electronic flight bag (EFB), a computer aiding on board navigation and/or any other existing embedded system.

In particular, each aforementioned module 10, 12, 14 of each application at least partially assumes the form of software executable by a processor and stored in a memory of the corresponding computer. The processor is for example a microprocessor, in particular of the PowerPC type.

According to one embodiment, each application 6 at least partially assumes the form of software executable by a single-core processor, by a multi-core processor or by a plurality of separate processors.

In a variant or additionally, each of the aforementioned modules 10, 12, 14 at least partially assumes the form of a physical device, for example a programmable logic circuit, such as an FPGA (Field Programmable Gate Array), or the form of a dedicated integrated circuit, such as an ASIC (Application-Specific Integrated Circuit).

The applications 6 are in particular configured to be executed in parallel, for example simultaneously. For example, each application 6 is configured to perform processing operations, in particular via the modules 10, 12 and 14, and to access its replica 8 independently of the other applications 6.

In particular, each application 6 corresponds to a thread. Each application 6 for example corresponds to a potential user of the database 9.

Each replica 8 comprises a plurality of elements. In particular, each replica 8 comprises the same number and the same types of elements. Each element comprises a value and a version number. Preferably, each element comprises an identification (or ID) and information relative to the type of element.

The value is for example a function.

According to one embodiment, the value of at least one element comprised in each replica 8 is a function of a unique argument.

When the function depends on a unique argument, potential conflicts between the replicas 8 can be managed by a specific design of the applications 6. In particular, a unique application 6 is authorized to modify the unique argument of the element in question. The other applications are only authorized to update the value of this element as a function of information coming from this unique application regarding this element.

For example, each element of the database 9 that has a value that is a function depending on a unique argument can be modified by a single application, specific to the corresponding element.

As a result, cases of conflicts are theoretically impossible for elements [comprising] a value in the form of a function of a unique argument, since each element has only one producer, namely in particular the application 6 associated with the corresponding element. Thus, if an application other than that which is authorized modifies the value, this corresponds to a programming error.

In one exemplary embodiment, the value of at least one element comprised in each replica 8 is a function of a plurality of value arguments. The function for example has a sum, a product or a fraction of the value arguments.

For example, each value argument of an element having several value arguments is a value argument or a value of another element. As a result, a value whose function depends on several value arguments can be deducted in full from elements each having a unique value argument. In particular, the value arguments can be recalculated by an application 6 of the group of applications.

A value argument is for example data from one of the sensors 2 of the on-board system 4.

A management method of the database 9 shared by the group of applications will now be described, in reference to FIGS. 2 and 3. The management method in particular makes it possible to synchronize the replicas 8 using version numbers of the elements.

The management method is implemented by the on-board system 4, and in particular by the applications 6.

The management method comprises a modification step 100, an incrementation step 102, a transmission step 104, a synchronization step 106, a correction step 108, an additional transmission step 110 and an additional synchronization step 112.

During the initialization step of the management method, the replicas 8 are identical to one another. "Identical replicas" means that the version number and the value of each element of a replica 8 is identical to the version number and the value of this element in the other replicas 8.

Figure 3:
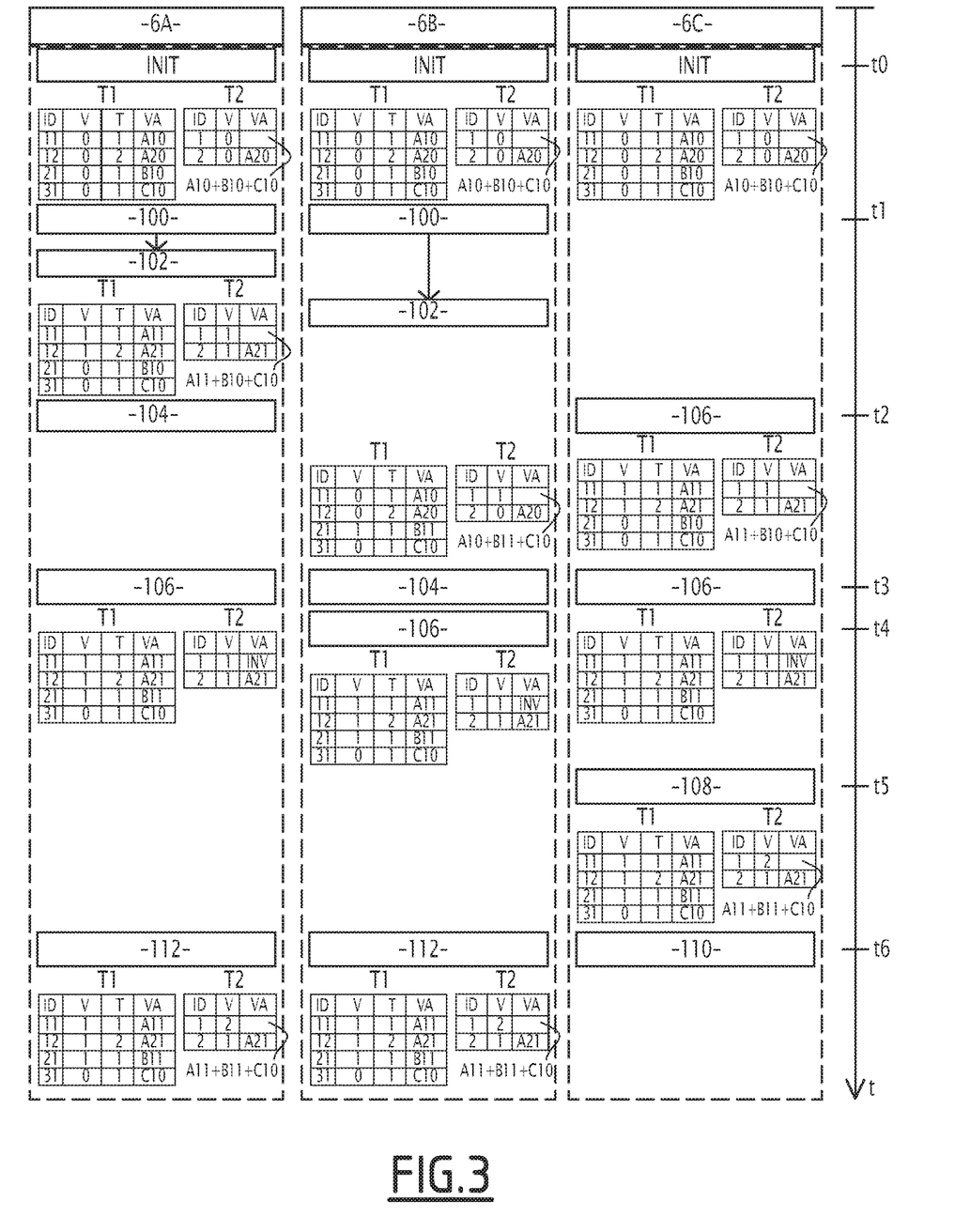
FIG. 3 is a schematic view illustrating an exemplary embodiment of the management method of FIG. 2.

In FIG. 3, an exemplary embodiment of the management method by three applications 6A, 6B and 6C is illustrated. The applications 6A, 6B, 6C perform steps chronologically, following the direction of time indicated by an arrow t. The initialization instant of the method is illustrated by "INIT" at instant t0 in FIG. 3. Each application 6A, 6B, 6C comprises a first table T1 and a second table T2. In the first table T1 and the second table T2, the elements correspond to rows. The first table T1 comprises four elements and the second table T2 comprises two elements. Each element of the first table T1 comprises an identification ID, a version V, information relative to the type T and a value VA. Each element of the second table T2 comprises an identification ID, a version V and a value VA. In particular, the elements of the second table T2 are devoid of information relative to the type of element.

Hereinafter, the elements are designated by their identification ID, as follows: element "ID". The identification ID for example comprises one or two whole numbers. For example, the identification ID of the elements of the first table T1 comprises two figures, the first figure of which relates to the application 6 authorized to modify this element, for example "1" for the application 6A, "2" for the application 6B and "3" for the application 6C. In the example of FIG. 3, the application 6A is authorized to modify the elements "11" and "12", the application 6B is authorized to modify the element "21" and the application 6C is authorized to modify the element "31".

The identification ID of the elements of the second table T1 for example comprises a whole number.

The version V is for example a whole number. In the example of FIG. 3, all of the elements at the instant t0 comprise the version "0".

The type T is for example a whole number. In the example of FIG. 3, the elements have type "1" or "2".

The value VA is a function comprising one or several value arguments. For example, the values VA of the elements of the first table T1 are values that are functions having a unique value argument. The function is in particular a constant function. For example, the value argument of the function is equal to the value VA. The value VA of the element "11" is "A10", the value VA of the element "12" is "A20", the value VA of the element "21" is "B10" and the value VA of the element "31" is "C10". In the example, the value VA of the element "1" of the second table T2 is a function comprising three value arguments, namely the value arguments "A10", "B10" and "C10" at the instant t0. The value VA of the element "2" of the second table T2 is a function comprising a unique value argument, namely "A20".

For example, the value arguments of an element depend on the value VA of several elements comprising a unique function argument. In the example of FIG. 3, the value arguments of the element "1" are the values VA of the elements "11", "21" and "31". Thus, the value VA of the element "1" depends on the values VA of the elements "11", "21" and "31".

During the modification step 100, one application 6 among the plurality of applications modifies the value of at least one element in its replica 8 of the database 9. This application 6 is called "active application" hereinafter. The element whose value is modified during the modification step 100 is called "modified element" hereinafter.

According to one example, several applications 6 implement the modification step 100 simultaneously.

Figure 2:
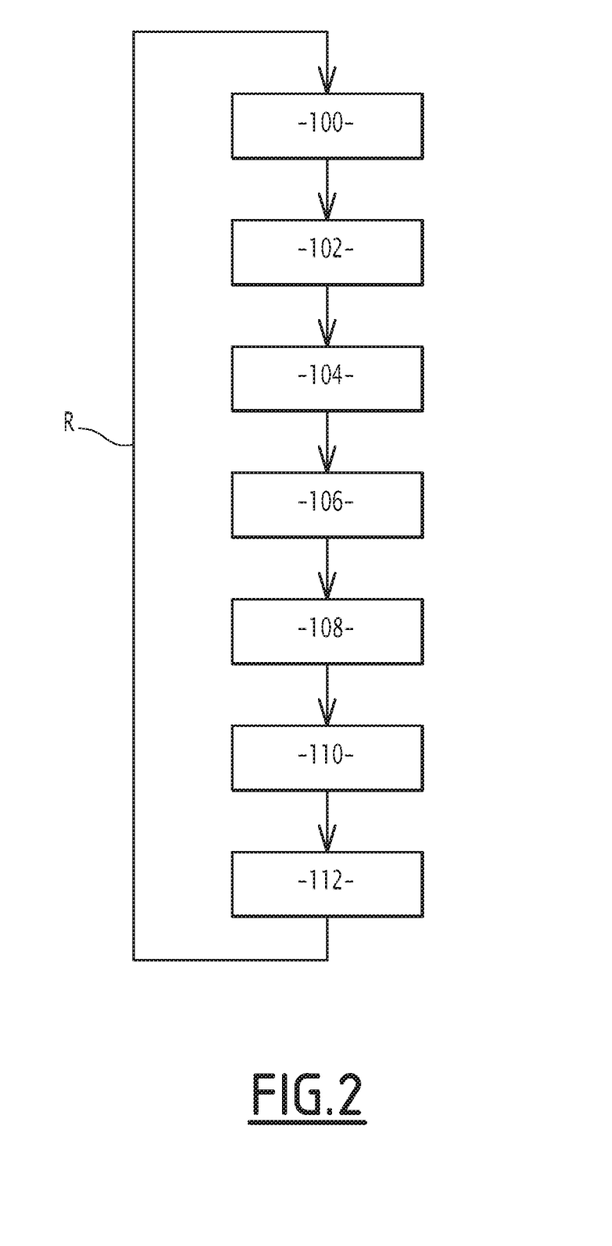
FIG. 2 is a flowchart of a management method carried out by the on-board system of FIG. 1.

In reference to FIG. 2, during the incrementation step 102, the active application increments the version number of the modified element(s). For example, if the version number is "0" during the implementation of the modification step 100, the active application changes the version number from "0" to "1" for this element.

One example of the modification 100 and incrementation 102 steps will now be described in reference to FIG. 3.

The applications 6A and 6B are active applications. They implement, from the instant t1, the modification step 100 and the incrementation step 102.

The application 6A modifies the value VA of the element "11" from the value "A10" to the value "A11" and the value VA of the element "12" from the value "A20" to the value "A21". The application 6A also modifies the elements "1" and "2" of the second table T2, since the value VA of these elements depends on the value VA of the elements of the first table T1. The application 6A then modifies the value VA of the element "1" from "A10+B10+C10" to "A11+B10+C10" in order to account for the modification of the value of the element "11". The application modifies the value VA of the element "2" from "A20" to "A21" in order to account for the modification of the value VA of the element "12". The application 6A further increments the version V of the elements "11", "12", "1" and "2" from the version "0" to the version "1".

During the implementation of the modification 100 and incrementation 102 steps by the application 6A, the application 6B also implements the modification 100 and incrementation 102 steps. The application 6B then modifies the value VA of the element "21" from the value "B10" to the value "B11" and increments the version V of this element from version "0" to version "1".

In reference to FIG. 2, during the transmission step 104, the active application transmits transmission data to the other applications 6 of the group of applications. The transmission data comprises the element modified during the modification 100 and incrementation 102 steps, and an earlier version number of this modified element. "Earlier version number" means the version number of the modified element before the implementation of the modification 100 and incrementation 102 steps.

In particular, the active application transmits the modifications done on its replica 8 during the modification step 100 and the incrementation step 102.

When several applications 6 implement the modification step 100 at once, each active application transmits transmission data to the other applications during the transmission step 104, following the implementation of the modification 100 and incrementation 102 steps.

During the synchronization step 106, at least one application 6 of the group of applications other than the active application updates its replica 8 of the database 9 based on a comparison of the earlier version number with the version number of the modified element in this replica 8.

Preferably, each application 6 other than the active application implements the synchronization step 106 when this application does not have processing in progress, such as a modification of an element in its replica 8.

For example, for an application 6 from the group of applications, if the version number of the modified element is incremented by an integer relative to the earlier version number, this application 6 replaces the value of the element comprised in the replica 8 by the value of the modified element comprised in the transmission data.

According to one embodiment, an application 6 other than the active application declares the modified element to be valid if the earlier version number is equal to the version number of this element in its replica 8 from the database 9. Preferably, the application 6 declares the modified element to be invalid otherwise. In particular, if the earlier version number differs from the version number of this element in the replica 8 from the application 6, this application 6 declares the element to be invalid.

For example, if the element is declared to be valid, the application 6 replaces the corresponding element in its replica 8 of the database 9 with the modified element.

For example, if the element is declared to be invalid, the application 6 marks the value of this element as invalid in its replica 8 of the database 9.

According to one embodiment, if the element is declared to be invalid, the application 6 changes the version number of said element by the highest version number among the version number in its replica 8 of the database 9 and the version number comprised in the modified element comprised in the transmission data.

The change of the version number two the highest number makes it possible to store the highest number, even though the value is not valid. Thus, during any correction in the value, the highest version number is known for the application 6.

One example of the transmission 104 and synchronization 106 steps will now be described in reference to FIG. 3.

The application 6A implements the transmission step 104 at the instant t2. The application 6A then transmits the transmission data to the other applications 6B, 6C. In particular, the application 6A transmits all of the elements of tables T1 and T2 or all of the modified elements to the other applications 6B, 6C.

The application 6B has processing in progress at the instant t2, that is to say the implementation of the modification and incrementation steps 100, 102. Thus, the application 6B takes the transmission data into account only at the instant t4 at the end of its processing.

The application 6C has no processing in progress at the instant t2 and thus implements the synchronization step 106 in order to synchronize its replica 8 with the transmission data. The transmission data comprises the earlier version number "0" for the elements "11", "12", "1" and "2", and the application 6C also comprises the version number "0" for these elements in its replica 8. The application 6A thus considers these modified elements to be valid. In its replica 8, the application 6C replaces the values VA and the versions V of the elements "11", "12", "1" and "2" according to the transmission data.

Still in reference to the example of FIG. 3, during the instant t3, the application 6B, having completed its processing, implements the transmission step 104 by transmitting, to the applications 6A and 6C, the transmission datum comprising the elements "21" and "1".

The applications 6A and 6C implement the synchronization step 106 at the instant t3. The transmission data comprises, for the elements "21" and "1", the earlier version number "0". The version number of the element "21" is "0" in the replicas 8 of the applications 6A and 6C. Thus, the applications 6A and 6C replace the element "21" in their replica 8 with the element "21" comprised in the transmission data.

The version number of the element "1" in the replicas 8 of the applications 6A and 6C is "1". The earlier version number of the element "1" is therefore different from the version number of this element in the replicas 8 of the applications 6A and 6C. The applications 6A and 6C thus declare the element "1" to be invalid in their replicas 8, indicated by "INV" in FIG. 3.

At the instant t4, the application 6B implements the synchronization step 106 in order to take account of the transmission data transmitted during the instant t2 by the application 6A. As a result, the application 6B also declares the element "1" to be invalid in its replica 8.

During the correction step 108, an application 6 of the group of applications calculates each part of the value of the element declared to be invalid, based on the transmission data, in order to obtain a corrected element. The application 6 implementing the correction step 108 is called "correction application".

For example, the correction application applies a transfer function to the value of the element declared to be invalid. The transfer function for example depends on the value of arguments of the element declared to be invalid.

According to one example, the correction application also increments the version number declared to be invalid.

During the additional transmission step 110, the correction application transmits the corrected element to the other applications 6 of the group of applications. For example, the correction application transmits transmission data comprising the corrected element.

During the additional synchronization step 112, the applications 6 other than the correction application update the replica 8 of the database 9 based on a comparison of the earlier version number with the version number of said element in this replica 8. As illustrated by the loop R visible in the example of FIG. 2, the management method is reiterated at the end of the additional synchronization step 112.

One example of the correction 108, additional transmission 110 and additional synchronization 112 steps will now be described in reference to FIG. 3.

The application 6C is the predetermined application for the correction of invalid elements, called correction application. At the instant t5, the application 6C implements the correction step 108 by calculating the value VA of the number "1", declared to be invalid. In particular, the application 6C applies the transfer function of the element "1" to the value arguments of this element. The correction application 6C thus obtains the value "A11+B11+C10" for the corrected element "1". The application 6C further increments the version number from "1" to "2" of this element.

At the instant t6, the application 6C implements the additional transmission step 110 by transmitting transfer data comprising the corrected element "1" to the other applications 6A and 6B. The applications 6A and 6B implement the additional synchronization step 112 by updating the replica 8 of the database 9 based on a comparison of the earlier version number, here version "1" for the element "1", with the version number of said element in this replica 8, here also version "1" for the element "1". The earlier version number is thus equal to the version number in the replicas 8 of the applications 6A and 6B and these applications replace the element "1" in their database 9 with the corrected element "1".

Figure 4:
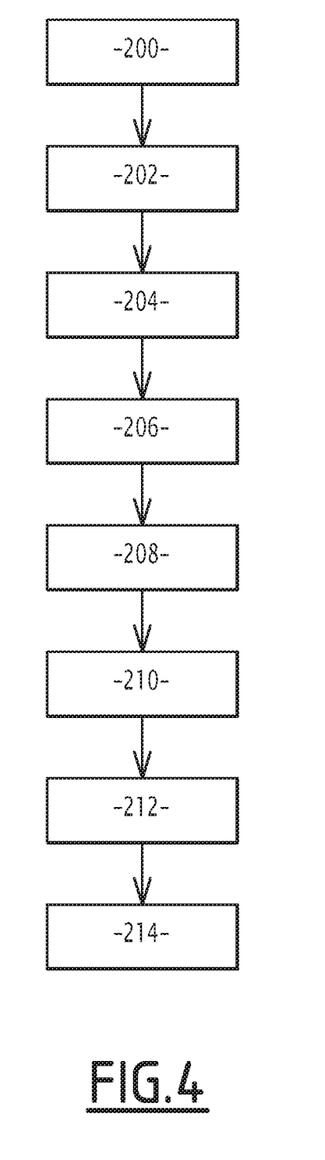
FIG. 4 is a flowchart of a method for updating a database, implemented by the on-board system of FIG. 1.

An update method will now be described. The update method is implemented by the on-board system 4. The update method in particular makes it possible to correct at least one element in the replicas 8 of the database 9.

Preferably, the update method does not require a version number of the elements. In particular, the applications 6 do not take the version number into account.

The update method comprises a reception step 200, a comparison step 202, a detection step 204, a marking step 206, a selection step 208, a transmission step 210, a correction step 212 and a transmission step 214.

During the initialization of the update method, the replicas 8 of the database 9 in particular comprise at least one element comprising at least one different value in one replica 8 relative to another replica 8.

During the reception step 200, one application 6 from the group of applications receives at least one element from the plurality of elements. The application 6 receiving this element or these elements is called processing application.

During the comparison step 202, the processing application compares the value of the received element with the value of this element in its database 9 replica 8.

In particular, when the value of the received element is equal to the value of this element in its replica 8, the processing application does not modify its replica 8.

When the value of the received element differs from the value VA of this element in the replica 8 from the database 9 of the processing application, this application implements the detection step 204 and the marking step 206.

During the detection step 204, the processing application detects an inconsistency of the value of the received element relative to an expected value of this element.

The processing application determines the inconsistency of the value according to the operation of the on-board system(s) 4.

For example, the value is inconsistent if the value depends on one or several obsolete value arguments.

"Obsolete value argument" for example means that the value argument is updated in a different replica 8 from the replica 8 of the processing application. For example, the value argument is updated based on data from the sensor 2.

The obsolete value argument in particular reflects a past state of the on-board system 4. Thus, the obsolete value argument is void because data supplied by the sensor 2 for this value argument have changed.

In particular, the value VA is inconsistent if at least one value argument belongs to a different instant from the other value arguments for this value.

The value VA is consistent if all of the value arguments correspond to a same time context. For example, the value VA is consistent if all of the value arguments correspond to the current data for the corresponding sensors 2. The expected value is in particular the value VA for which the value arguments correspond to the current data of the sensors 2 for each value argument.

According to one example, the expected value is a value determined by calculating the transfer function that depends on the value arguments. According to another example, the expected value is a precalculated value.

For example, the expected value is determined by applying a transfer function reproducing the operation of the on-board system 4 to a value argument. The value argument is in particular data from at least one sensor 2 of the on-board system 4.

According to one example, the inconsistency of the value is detected by the version number of the element.

The inconsistency of the value of the received element is thus detected by the processing application during the detection step 204.

During the marking step 206, the processing application marks the value of the received element as being invalid. The element is called invalid element.

The value marked as invalid is in particular a function of several value arguments. For example, each value argument is associated with a corresponding application from the group of applications 6. In this case, the value argument associated with this application is modifiable exclusively by this application 6.

According to one example, the value marked as being invalid of at least one element is a function of a unique argument.

During the selection step 208, an application 6 is selected from the plurality of applications. The selected application is the correction application. The correction application is for example selected based on an invalid element type needing to be corrected.

According to one example, the correction application is predetermined before the implementation of the method.

The correction application is for example selected based on a workload of each application 6. For example, the application 6 having the lowest computing load in progress among the plurality of applications is selected.

For example, the correction application is the application 6 having a minimal waiting time between the marking step 206 and an incident in which the application 6 has the available computing resources to perform the correction step 212.

For example, the correction application is the application 6 having the highest activation frequency among the applications 6. This in particular makes it possible to minimize the invalidity duration of the invalid element. "Activation frequency" means the number of times per second that the application 6 is activated to perform calculations. In particular, the activation frequency corresponds to the waiting time until the next availability of the corresponding application. For example, the maximum waiting duration is equal to twice the period of the activation frequency.

According to one example, if the application having the highest activation frequency does not have sufficient computing resources to perform the correction step 212, an application 6 having a lower activation frequency is chosen.

Preferably, the application 6 having the highest activation frequency among the applications having sufficient computing resources is chosen.

During the transmission step 210, the processing application transmits the invalid element to at least one other application 6, in particular to the correction application.

According to one example, the processing application is separate from the correction application.

According to another example, the processing application is the correction application. In such a case, the transmission step 210 for example comprises an internal transmission within the application 6 appearing as processing application and correction application.

During the correction step 212, the correction application calculates the value of the invalid element. The element thus corrected is called corrected element.

For example, the correction application applies the transfer function to the value of the invalid element in order to obtain a corrected value of the corrected element. The transfer function in particular depends on several transfer arguments. According to one example, each transfer argument corresponds to one of the value arguments, in particular coming from the sensors 2.

The transfer function reproduces the operation of the on-board system 4. In particular, the transfer function is configured to take data into account from the sensors 2.

If the value argument of at least one invalid element is a unique argument, each application 6 restarts during the correction step 212. In particular, during the restart, each application 6 initializes the unique argument at an initial argument specific to each element. For example, each initial argument is the argument of the respective element in a state of the replica 8 of the database 9 in which the set of elements is valid. Such an initial argument is for example recorded in each replica 8 of the database 9.

During the transmission step 214, the correction application transmits the corrected element to the other applications 6 of the group of applications.

In particular, at the end of the update method, the values of all of the elements are valid.

According to one example, the update method comprises one or several steps of the management method. For example, the update method comprises at least one step among the modification step 100, the incrementation step 102, the transmission step 104, the synchronization step 106, the correction step 108, the additional transmission step 110 and the additional synchronization step 112.

According to one example, the management method comprises one or several steps of the update method. For example, the management method comprises at least one step among the reception step 200, the comparison step 202, the detection step 204, the marking step 206, the selection step 208, the transmission step 210, the correction step 212 and the transmission step 214.

The invention claimed is:

1. A method for managing a database shared by a group of applications, the applications being implemented by one or several on-board systems, the database comprising a plurality of elements, each element comprising a value and a version number, each application comprising a replica of the database, the replicas being identical during the initialization of the method, the method comprising:
   a modification step comprising modifying the value of at least one element in the database of an application, called active application, of the group of applications;
   an incrementation step comprising incrementing the version number of said element in the replica of the database of the active application;
   a transmission step during which the active application transmits transmission data to the other applications of the group of applications, the transmission data comprising the element modified during the modification and incrementation steps, and an earlier version number of this modified element, the earlier version number being the version number of this element before the implementation of the modification and incrementation steps; and
   a synchronization step, during which at least one application of the group of applications other than the active application updates its replica of the database based on a comparison of the earlier version number with the version number of said element in this replica;
   wherein:
   the value of at least one element comprised in each replica of the database is a function of a plurality of value arguments,
   the one or several on-board systems is implemented in an aircraft,
   each value argument of the plurality of value arguments includes sensor data from at least one sensor, and
   each of the at least one sensor is configured to measure the sensor data associated with one or more of a situation of the aircraft, a first environment of the aircraft, or a second environment of another aircraft.

2. The management method according to claim 1, wherein, during the synchronization step, an application other than the active application declares the modified element to be valid if the earlier version number is equal to the version number of this element in its replica of the database, the application declaring the modified element to be invalid otherwise.

3. The management method according to claim 2, wherein said application replaces the corresponding element in its replica of the database with the modified element if this modified element is declared to be valid.

4. The management method according to claim 2, wherein, when the element is declared to be invalid, said application marks the value of said element as invalid in its replica of the database.

5. The management method according to claim 2, wherein, when the element is declared to be invalid, the application changes the version number of said element by the highest version number among the version number in its replica of the database and the version number comprised in the modified element comprised in the transmission data.

6. The management method according to claim 2, comprising a correction step during which an application from the group of applications, called correction application, calculates the value of the element declared to be invalid in order to obtain at least one corrected element.

7. The management method according to claim 6, further comprising a step for additional transmission of the corrected element by the correction application to the other applications of the group of applications.

8. The management method according to claim 1, wherein each replica of the database is exclusively modifiable by the application comprising this replica.

9. The management method according to claim 1, wherein the modification step is implemented, for a predetermined element, by a single predetermined application of the group of applications.

10. The management method according to claim 1, wherein, during the modification step, the active application modifies a value argument of the plurality of value arguments, this value argument being associated with the active application.

11. Non-transitory computer-readable medium including a computer program comprising software instructions which, when executed by a computer, implement a method according to claim 1.

12. An on-board system for managing a database shared by a group of applications, the applications being configured to be implemented by the on-board system, the database comprising a plurality of elements, each element comprising a value and a version number, each application comprising a replica of the database, the replicas being identical during the initialization of the on-board system,     wherein one application, called active application, of the group of applications is configured to modify the value of at least one element in its replica of the database;

wherein the active application is configured to increment the version number of said element in the replica of the database;

wherein the active application is configured to transmit transmission data to the other applications of the group of applications, the transmission data comprising the modified and incremented element, and an earlier version number of this element, the earlier version number being the version number of this element before its modification and incrementation; and wherein at least one application of the group of applications other than the active application is configured to update its replica of the database based on a comparison of the earlier version number with the version number of said element in this replica;

wherein:
    the value of at least one element comprised in each replica of the database is a function of a plurality of value arguments,
    the one or several on-board systems is implemented in an aircraft,
    each value argument of the plurality of value arguments includes sensor data from at least one sensor, and
    each of the at least one sensor is configured to measure the sensor data associated with one or more of a situation of the aircraft, a first environment of the aircraft, or a second environment of another aircraft.

* * * * *